Aug. 13, 1940.   M. WEIMANN   2,211,087
METHOD OF EXTRACTING ALIPHATIC ACIDS FROM AQUEOUS SOLUTIONS
Filed Nov. 10, 1937
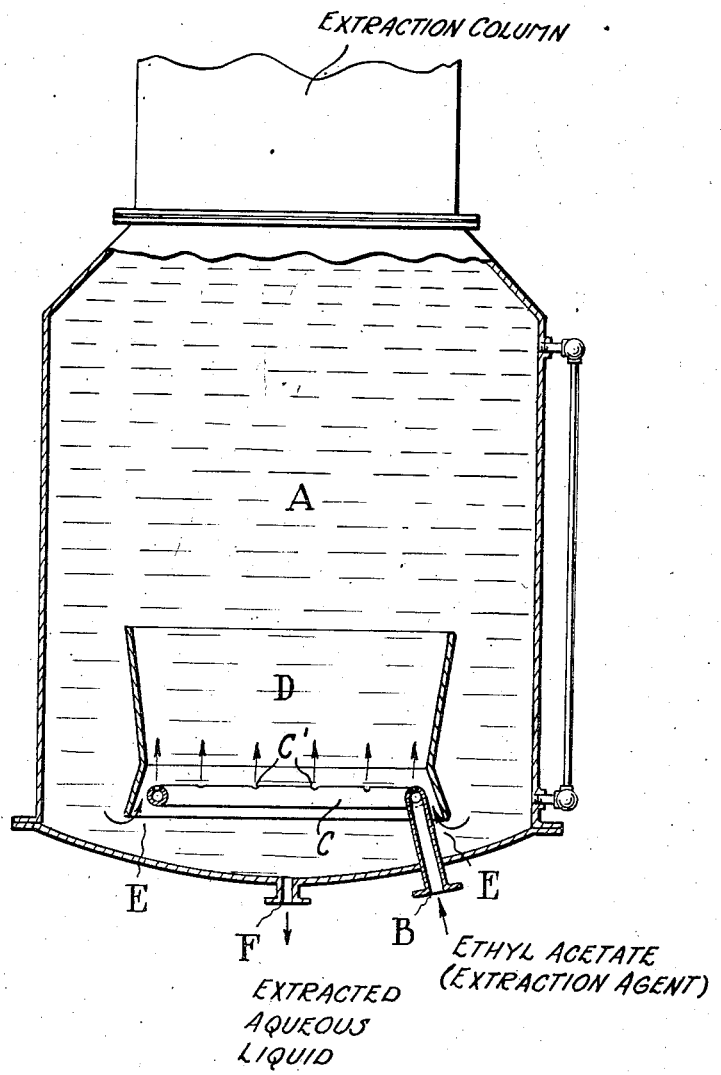
Inventor
Max Weimann,
By Bailey & Carson
Attorneys

Patented Aug. 13, 1940

2,211,087

UNITED STATES PATENT OFFICE

2,211,087

METHOD OF EXTRACTING ALIPHATIC ACIDS FROM AQUEOUS SOLUTIONS

Max Weimann, Frankfort-on-the-Main, Germany, assignor, by mesne assignments, to Chemical Marketing Company Inc., New York, N. Y.

Application November 10, 1937, Serial No. 173,949
In Germany November 10, 1936

8 Claims. (Cl. 260—541)

This invention relates to a process for the concentration of organic acids such as acetic acid from aqueous solutions by extraction with suitable liquids, such as acetic acid ethylester or other organic esters, ethers, alcohols, e. g., amylalcohol, phenol, phenol ethers or the like, or mixtures thereof, as well as apparatus for carrying out the process.

It is known to extract organic acids from their aqueous solutions by treating them countercurrently with suitable solvents, which are not miscible with water and which possess rather good solvent action on the acids to be extracted. For this purpose acetic acid ethylester is advantageously used as after the extraction the water present in the affluent acetic acid ethylester may be removed in the form of an azeotropic mixture of the ester and water.

In the known process of extraction the aqueous solution and the extraction liquid are introduced at the different ends of the extraction column, in such a way that the liquid of higher specific gravity is introduced at the upper part of the column. In case of the extraction of acetic acid by acetic acid ethylester the aqueous solution is introduced at the upper part of the column, and the ethylester near the bottom.

The extraction column may be filled in the most simple manner with filling bodies, such as Raschig rings or the like. When using such a column only a moderate effect of extraction is obtained; even by increasing the height of these columns the yield of extraction can not be improved.

It is an object of this invention to carry out the extraction of organic acids, especially acetic acid with suitable liquids as acetic acid ethylester in a column provided with filling bodies, while obtaining extraction yields in acetic acid of nearly 100%.

It is an other object of the invention to render superfluous any mechanical energies, which formerly served for finely distributing the components.

According to the invention a surprising and favorable effect is obtained in the known countercurrent extraction process by employing the usual columns filled with filling bodies and increasing the space velocity of the extraction components, so that the aqueous liquid at the lower end of the column is no longer clear but still turbid.

The invention may be understood by the following examples.

Example 1

A column of a height of 10 m. and a diameter of 200 mm. was filled with Raschig rings, the size of which was 15 x 15 mm. In this column 200 kg. of a pyroligneous acid, containing 10.3% of volatile acid, were treated countercurrently with 400 kg. ethylacetate. The velocity of the two extraction components relative to each other was 0.57 cm. sec. calculated without taking the filling bodies into consideration. The affluent water was turbid and contained 0.09% volatile acid. The yield of extraction was 99%.

It is practically not useful to increase the velocities above a certain degree, as may be seen from the following:

Into the same apparatus as above 400 kg. pyroligneous acid and 800 kg. ethyl-acetate were introduced to a relative velocity of 1.2 cm. sec., calculated without taking the filling bodies into consideration. In this case the effluent water contained 0.24% volatile acid. The yield was 97.7% of the acid introduced. On the other hand, it may not be disregarded, that in this case the quantities of pyroligneous acid, treated in the apparatus of the same size, were 8 times the quantity treated when the effluent water was clear.

Example 2

In the same apparatus as used in Example 1 an aqueous solution containing 25% acetic acid was treated countercurrently with ethylacetate, the ratio of dilute acid and ethylacetate being 1:4. The relative velocity was kept at 0.55 cm. sec. The effluent water contained 0.08% volatile acid, the yield was 99.7%.

Example 3

A column of a height of 10 m. and a diameter of 550 mm. was provided with Raschig rings having edges of 25 mm. Through this apparatus 4150 kg. ethylacetate and 1800 kg. pyroligneous acetic acid, containing 10.3%, were passed. The relative velocity of the 2 liquids to each other was 0.73 cm. sec. The outflowing water was milky and contained 0.066% volatile acid. The yield of extraction was 99.36%.

If such high relative velocities are not used the yield of extraction is much less, e. g., when using Raschig rings of 25 mm. and a ratio between ethylacetate and pyroligneous acetic acid of 2:1, the outflowing water contain 1.7% and the yield is more than 84%.

The advantage of the process according the invention could not be expected. It is known, that when extracting in counter current columns, layers of decreasing concentrations of acid in the aqueous medium are to be maintained within the columns. In case of the extraction process this is only possible by keeping the flowing velocities rather low, so that the effluent liquids are clear. It would be supposed that by increasing the velocities the layers of concentration would be extinguished so that the column gave only the effect of a mixing vessel.

The process according to the invention may be carried out in the most simple manner. The extraction column may be a usual filling-bodies column which is provided with Raschig rings, pryms-rings, or saddle bodies or like. The aqueous acid to be extracted is introduced into the upper part of the column by means of simple distributing devices, e. g., perforated tube, shields. At the top of the same part there is the outlet for the extracting liquid saturated with the acid. The bottom of the column is provided with an inlet for the organic solvent (ethylacetate) and with an outlet for the water nearly free from acid. The outlets contain sight glasses, so that the outflowing liquids may be controlled. The ratio of dilute acid and the extraction agent may be varied within wide limits. However, it should not be greater than 1:1. Advantageously one part of 10% dilute acetic acid is treated with 1.5:2.5 parts of ethylacetate. If the acid to be extracted possess a higher concentration such as 20.5%, the quantities of ethylacetate may be higher, e. g., 4 times as much as the dilute acid used.

In carrying out the process according to the invention the relative velocity is gradually increased till the outflowing liquid becomes turbid.

I have found, that this is realized if the relative velocities of the concentration agent and the dilute acid to each other amount to more than 0.2 cm./sec. preferably at least 0.4 cm./sec. When the filling bodies possess a diameter or length of edges of 8–10 mm., the velocities are to be at least 0.2–0.3 cm./sec., in case of filling bodies with a length of edges of 15–25 mm., velocities of 0.4–1.2 cm./sec., in case of filling bodies of diameter or length of 25–70 mm., the velocities may be more than 1 cm./sec. The relative velocity of two countercurrently flowing liquids is the sum of the absolute velocity of each liquid. The relative velocities given are calculated without taking the filling bodies which may be present in the extraction column into consideration. The relative velocities of the liquids in centimeters per second are calculated from the following equation:

$$\frac{(A+B)}{3600 \cdot X} = \text{velocity in cm./second}$$

In such equation A and B, respectively, represent the volumes of the liquids flowed through the extraction column in cubic centimeters per hour and X represents the cross-sectional area of the extraction column in square centimeters.

For causing the extraction components to flow the hydrostatic pressure of the dilute acid and the extraction agent, flowing from containers standing above the extraction column, may be sufficient. It is possible to combine 2 or more columns with each other.

I have further found, that the extraction agent which is carried away in the turbid effluent water can be separated therefrom in the most simple manner by injecting the inflowing extraction agent within the medium of the outflowing water at the bottom of the column. By means of such an injector the fine particles of the extraction agent in the water are easily precipitated and driven back with the inflowing extraction agent into the extraction apparatus. The invention may be performed by making the turbid water before the column, pass immediately below the spot where the pure ethylacetate is introduced into the extraction column.

In the drawing A is the bottom part of an extraction column. The extraction agent is introduced by B and the perforations C'. The annulus is surrounded by a wall D, which may be round or in form of a polygon. Within D the extraction agent streams upwards, whereas outside the aqueous phase in a turbid state flows downwards. The space E serves to communicate the outside space with the inside space D. A suction effect is exercised on the downwardly streaming turbid water by the upwardly streaming extraction agent whereby the small particles of extraction agent are caused to separate from the water and to join the fresh concentration agent. In this way the water free from acid flows out at F. It can be discarded after being treated in a distillation column.

The invention is not limited to the apparatus shown. All apparatus is suitable which causes a sufficient suction effect upon the effluent water to be cleared at a certain velocity of the injected extraction agent. The injecting effect may be improved by using an apparatus similar to the steam or water injecting devices for pumps. It is preferable to provide separately walls or other directing means, so that the main quantity of water sinking down is prevented from sinking down on the upwards flowing extraction agent, thus decreasing the injecting effect of the extraction agent.

What I claim is:

1. Process for the concentration of lower aliphatic acids contained in aqueous solutions by extraction with liquids comprising passing the dilute lower aliphatic acid and the extraction agent countercurrently through a column containing filling bodies at a relative velocity sufficient to cause the outflowing extracted aqueous liquid to contain suspended particles of extraction agent causing a turbidity therein.

2. Process for the concentration of acetic acid contained in aqueous solutions by extraction with ethyl-acetate comprising passing the dilute organic acid and the extraction agent countercurrently through a column containing filling bodies at a relative velocity sufficient to cause the outflowing extracted aqueous liquid to contain suspended particles of extraction agent causing a turbidity therein.

3. Process for the concentration of lower aliphatic acids contained in aqueous solutions by extraction with liquids comprising passing the dilute lower aliphatic acid and the extraction agent countercurrently through a column containing filling bodies at a relative velocity of at least 0.2 cm./sec. calculated without considering the volume of the filling bodies contained in the column and sufficient to cause the outflowing extracted aqueous liquid to contain suspended particles of extraction agent causing a turbidity therein.

4. Process for the concentration of lower aliphatic acids contained in aqueous solutions by extraction which liquids comprising passing the dilute lower aliphatic acid and the extraction agent, countercurrently through a column containing filling bodies of a diameter of 15–25 mm. at a relative velocity of 0.4–1.2 cm./sec.

5. Process for the concentration of lower aliphatic acids contained in aqueous solutions by extraction which liquids comprising passing the dilute lower aliphatic acid and the extraction agent countercurrently through a column containing filling bodies of a diameter of 25–70 mm. at a relative velocity of 1 cm./sec.

6. A process for the concentration of a lower aliphatic acid contained in an aqueous solution by extraction with a liquid comprising passing the dilute lower aliphatic acid and an extraction agent of lower specific gravity countercurrently through a column containing filling bodies at a relative velocity sufficient to cause the water at the bottom of the column to contain suspended particles of extraction agent causing a turbidity therein and so directing the inflow of fresh extracting agent that an injecting effect is caused upon the turbid water.

7. A process for the concentration of an aqueous solution of a lower aliphatic acid by extraction with liquids comprising passing the dilute lower aliphatic acid and the extraction agent countercurrently through a column containing filling bodies at a relative velocity just sufficient to cause the water flowing out of the column containing filling bodies to contain suspended particles of extraction agent causing a turbidity therein.

8. A process for the concentration of a dilute aqueous acetic acid containing solution by extraction with ethyl acetate comprising passing the dilute organic acid and the extraction agent countercurrently through a column containing filling bodies at a relative velocity just sufficient to cause the water flowing out of the column containing filling bodies to contain suspended particles of extraction agent causing a turbidity therein.

MAX WEIMANN.